US012203614B1

(12) United States Patent
Qu

(10) Patent No.: US 12,203,614 B1
(45) Date of Patent: Jan. 21, 2025

(54) LAWN LAMP

(71) Applicant: Linhai Qixiang Lighting Co., Ltd., Taizhou (CN)

(72) Inventor: Huasheng Qu, Taizhou (CN)

(73) Assignee: Linhai Qixiang Lighting Co., Ltd., Taizhou (CN)

( * ) Notice: Subject to any disclaimer, the term of this patent is extended or adjusted under 35 U.S.C. 154(b) by 0 days.

(21) Appl. No.: 18/615,572

(22) Filed: Mar. 25, 2024

(30) Foreign Application Priority Data

Mar. 8, 2024 (CN) ........................ 202420446791.X

(51) Int. Cl.

| | |
|---|---|
| ***F21S 4/28*** | (2016.01) |
| ***F21S 8/08*** | (2006.01) |
| ***F21V 17/16*** | (2006.01) |
| ***F21V 23/00*** | (2015.01) |
| ***F21Y 113/00*** | (2016.01) |
| ***F21Y 115/10*** | (2016.01) |

(52) U.S. Cl.

CPC ................. *F21S 4/28* (2016.01); *F21S 8/081* (2013.01); *F21V 17/162* (2013.01); *F21V 23/002* (2013.01); *F21Y 2113/00* (2013.01); *F21Y 2115/10* (2016.08)

(58) Field of Classification Search

CPC ...... F21S 4/28; F21S 8/081; F21S 4/15; F21S 4/20; F21S 8/032; F21S 4/10; F21V 17/162; F21V 23/002; F21V 17/164; F21V 17/16; F21Y 2113/00; F21Y 2115/10; F21Y 2106/16; F21Y 2105/16; F21W 2131/109

See application file for complete search history.

(56) References Cited

U.S. PATENT DOCUMENTS

| | | | | |
|---|---|---|---|---|
| 3,684,882 A * | 8/1972 | Mininno | F21S 9/02 362/184 |
| 9,297,505 B2 * | 3/2016 | Panzella | F21V 31/04 |
| 11,519,596 B2 * | 12/2022 | Altena | F21S 4/24 |
| 11,713,870 B1 * | 8/2023 | Boyd | F21S 2/005 362/249.02 |
| 2017/0127618 A1 * | 5/2017 | Bell | F21V 21/0824 |

FOREIGN PATENT DOCUMENTS

| | | | |
|---|---|---|---|
| CN | 204300791 U | * 4/2015 | |
| CN | 207555448 U | 6/2018 | |
| CN | 208107807 U | 11/2018 | |
| CN | 217356694 U | 9/2022 | |
| EP | 0959297 | * 11/1999 | F21V 33/00 |

OTHER PUBLICATIONS

EP 0959297, Nov. 24, 1999, Christoph Rosa, English Translation (Year: 1999).*

* cited by examiner

*Primary Examiner* — Erin Kryukova
(74) *Attorney, Agent, or Firm* — Nitin Kaushik

(57) ABSTRACT

The present disclosure discloses a lawn lighting and decoration tools, and aims to provide a lawn lamp which is convenient to mount, has a good lighting effect, and can ensure the aesthetics of a lawn. A key point of the technical solution of the present disclosure is as follows: A light string is arranged in a main frame body; the light string is distributed along a wiring slot formed by connecting an upper cover body with a lower cover body, so that mounting and wire arrangement are convenient, and entanglement of a wiring harness can be effectively prevented during use; and after the mounting of the light string is completed, light-emitting diode (LED) parts of the light string are exposed out of lamp outlets, which enhances the lighting effect of the lawn lamp.

7 Claims, 5 Drawing Sheets

LAWN LAMP

CROSS-REFERENCE TO RELATED APPLICATIONS

The application claims priority to Chinese patent application No. 202420446791.X, filed on Mar. 8, 2024, the entire contents of which are incorporated herein by reference.

TECHNICAL FIELD

The present disclosure relates to a lawn lighting tool, and more particular, to a lawn lamp.

BACKGROUND

In an urban construction process, it is usually necessary to set up green belts in communities, roads, parks, and squares, which not only improves the safety, but also can play an environmental protection and decoration role in a city. Meanwhile, in a green belt construction process, in order to ensure the safety of people during nighttime walking and enhance the decorative effect of the green belts at night, lawn lamps need to be laid inside the green belts to provide decorative lighting for the green belts.

At present, the lawn lamps usually use light-emitting diodes (LEDs) as light sources, and individual LEDs are connected by wires, which can cause entanglement during laying and use, thereby increasing the difficulty of mounting. In addition, the lawn lamps on the market are usually laid above a lawn, which can easily lead to a small lighting range and non-uniform brightness. Furthermore, the wires arranged above the lawn can greatly reduce the aesthetics of the green belts.

SUMMARY

For the shortcomings in the prior art, the present disclosure aims to provide a lawn lamp which is convenient to mount, has a good lighting effect, and can ensure the aesthetics of a lawn.

In order to achieve the above objective, the present disclosure provides the following technical solutions: A lawn lamp includes an upper cover body, a lower cover body detachably connected to the upper cover body, and a light string, wherein the upper cover body is assembled with the lower cover body to form a main frame body; the upper cover body is provided with a wiring slot; the upper cover body and the lower cover body are connected to form a mounting chamber; the mounting chamber is used for mounting and arranging the light string; the upper cover body is uniformly distributed with several fixed columns; each of the fixed columns is provided with a lamp outlet communicated to the mounting chamber; LED parts of the light string are threaded out of the mounting chamber; and luminous parts are exposed out of the lamp outlets.

In a further setting of the present disclosure, a connecting structure is arranged between the upper cover body and the lower cover body; the connecting structure includes a mounting hole arranged at a bottom of the upper cover body and a mounting column arranged on the lower cover body and matched with the mounting hole; the connecting structure further includes a convex block structure arranged on a lower cover plate and matched with a slot width of the wiring slot; and when the upper cover body and the lower cover body are connected and matched, the convex block structure on the lower cover plate is placed in the wiring slot.

Preferably, an extension frame body is arranged at a periphery of the upper cover body; a step structure is formed between the extension frame body and the bottom of the upper cover body; and when the mounting column of the lower cover body and the mounting hole of the upper cover body are mounted and matched, the lower cover body is flush with a lower surface of the extension frame body.

Preferably, the extension frame body includes two first edges and two second side edges; the two first side edges are uniformly distributed with several mounting through holes; the two second side edges are also uniformly distributed with mounting columns matched with the mounting through holes; and the mounting through holes and the mounting columns are used for extending and assembling a plurality of main frame bodies.

In a further setting of the present disclosure, an end surface positioning member is arranged on an end surface of an open end of each of the fixed columns; the end surface positioning member and the fixed column are connected to form a connecting plug for plugging various types of plastic flowers and plants; and a side wall of the end surface positioning member is in a circular arc shape.

Preferably, a maximum outer diameter of the end surface positioning member is between 1.1 times and 1.2 times an outer diameter of the fixed column.

In a further setting of the present disclosure, both the upper cover body and the lower cover body are of grid structures; a cell of each grid structure is of a polygonal structure; and the fixed columns are arranged at vertex angles of the various cells.

In a further setting of the present disclosure, a wire clamping structure is arranged between the wiring slot and each lamp outlet; the wire clamping structure includes an arc-shaped wall arranged at a connection between the lamp outlet and the wiring slot; an opening direction of the arc-shaped wall faces an outer side of the wiring slot; three wire clamping blocks are arranged on an inner wall of the lamp outlet; two wire clamping blocks are located on the same side, and the other wire clamping block is located on the opposite side; thicknesses of the two wire clamping blocks on the same side are greater than a thickness of the other wire clamping block; a distance between the two wire clamping blocks on the two sides is matched with an outer diameter of each LED; and distances between a guide part of the light string and the two wire clamping blocks on the two sides are in an interference fit.

By the adoption of the above technical solutions, the light string is arranged in the main frame body; the light string is distributed along the wiring slot formed by connecting the upper cover body with the lower cover body, so that mounting and wire arrangement are convenient, and entanglement of a wiring harness can be effectively prevented during use; and after the mounting of the light string is completed, the LED parts of the light string are exposed out of the lamp outlets, which enhances the lighting effect of the lawn lamp. Furthermore, ornamental flowers and plants are arranged above the main frame body to prevent the main frame body from being exposed out of the lawn, which improves the overall aesthetics of the lawn lamp.

In order to improve the accuracy of connection between the upper cover body and the lower cover body and improve the stability of the light string inside the main frame body, the connecting structure is arranged between the upper cover body and the lower cover body, so that the connection and matching between the upper cover body and the lower cover body are facilitated during the mounting. After the mounting of the upper cover body and the lower cover body is completed, the wiring harness in the wiring slot is fixed by the convex block structure on the lower cover plate, which prevents the movement of the wiring harness and improve the stability of the wiring harness in the wiring slot.

Further, in order to prevent the lower cover body from being separated after the lower cover body is connected with the upper cover body and improve the stability of the lawn lamp after mounting, the extension frame body is arranged at the periphery of the upper cover body, and the extension frame body and the upper cover body forms the step structure. Meanwhile, after the mounting and matching between the lower cover body and the upper cover body are completed, the lower cover body is flush with the lower surface of the extension frame body. After the mounting is completed, the lower cover body and a bottom surface of the extension frame body are located on the same plane. This prevents separation of the lower cover body from the upper cover body due to the action of an external force. Furthermore, the main frame body has a compact structure after assembling is completed, and the lawn lamp has good stability when mounted on a green belt.

Meanwhile, in order to facilitate decorating the mounted main frame body, the end surface positioning members are arranged on the end surfaces of the open ends of the fixed columns. The end surface positioning members are connected to the fixed columns to form the connecting plugs; and the connecting plugs are used for plugging various types of plastic flowers and plants. The maximum outer diameter of each end surface positioning member is between 1.1 times and 1.2 times the outer diameter of each fixed column. After the end surface positioning members and the fixed columns have been mounted, and the LED parts are exposed out of the fixed columns, gaps for plugging the plastic flowers and plants are formed between the LEDs and the end surface positioning members, so that it is convenient to mount the plastic flowers and plants; and the connection strength is high, so that it is hard for the plastic flowers and plants to fall off.

In addition, in order to enhance the lighting effect of the lawn lamp at night, the upper cover body and the lower cover body are arranged into the grid structures, and fixed columns are arranged at the vertex angles of the various cells. The LED parts of the light string are uniformly distributed on the main frame body to prevent the problem of concentrated or scattered lighting, which enhances the lighting effect of the lawn lamp. Meanwhile, the wire clamping structure is arranged between the wiring slot and each light outlet, so that the wiring harness inside the main frame body is further fixed through the wire clamping structure, which improves the stability inside the lawn lamp and can prevent the LED parts of the light string from moving at the lamp outlets.

Figure 1:
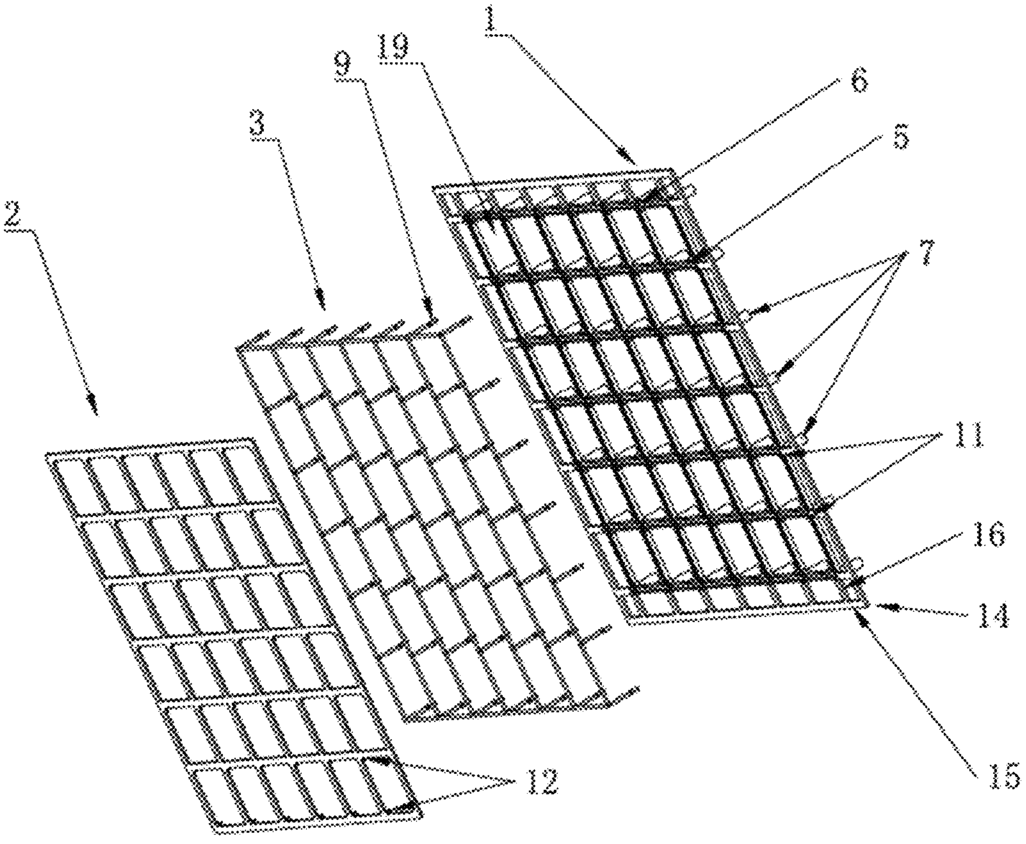
FIG. 1 is an exploded diagram of a lawn lamp embodiment according to the present disclosure.

Reference numerals in the drawings: 1: upper cover body; 2: lower cover body; 3: light string; 4: main frame body; 5: wiring slot; 6: mounting chamber; 7: fixed column; 8: lamp outlet; 9: LED part; 10: connecting structure; 11: mounting hole; 12: mounting column; 13: convex block structure; 14: extension frame body; 15: first side edge; 16: second side edge; 17: end surface positioning member; 18: connecting plug; 19: grid structure; 20: wire clamping structure; and 21: wire clamping block.

DETAILED DESCRIPTION OF THE EMBODIMENTS

Figure 2:
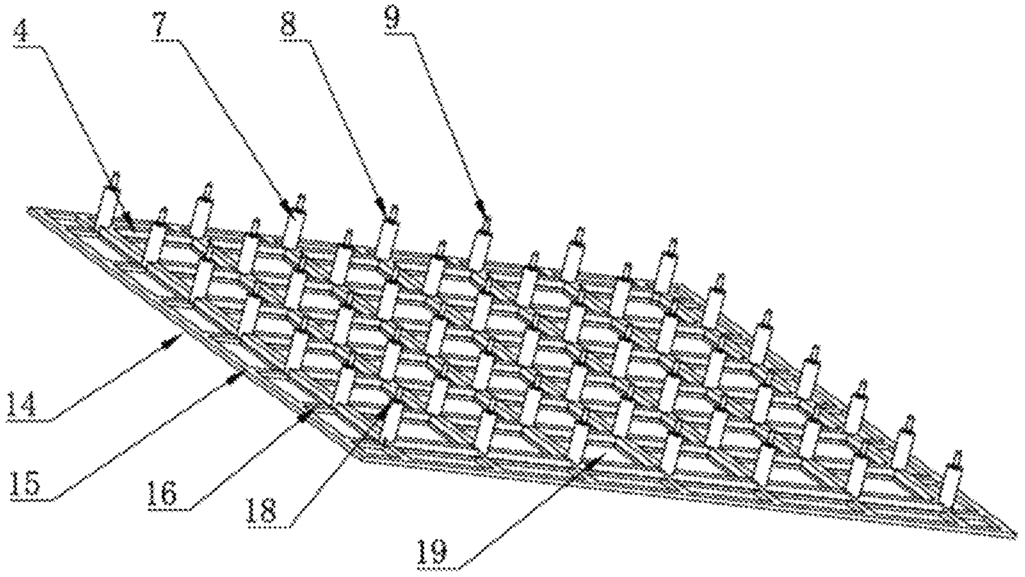
FIG. 2 is a specific schematic structural diagram of a lawn lamp embodiment according to the present disclosure.
Figure 3:
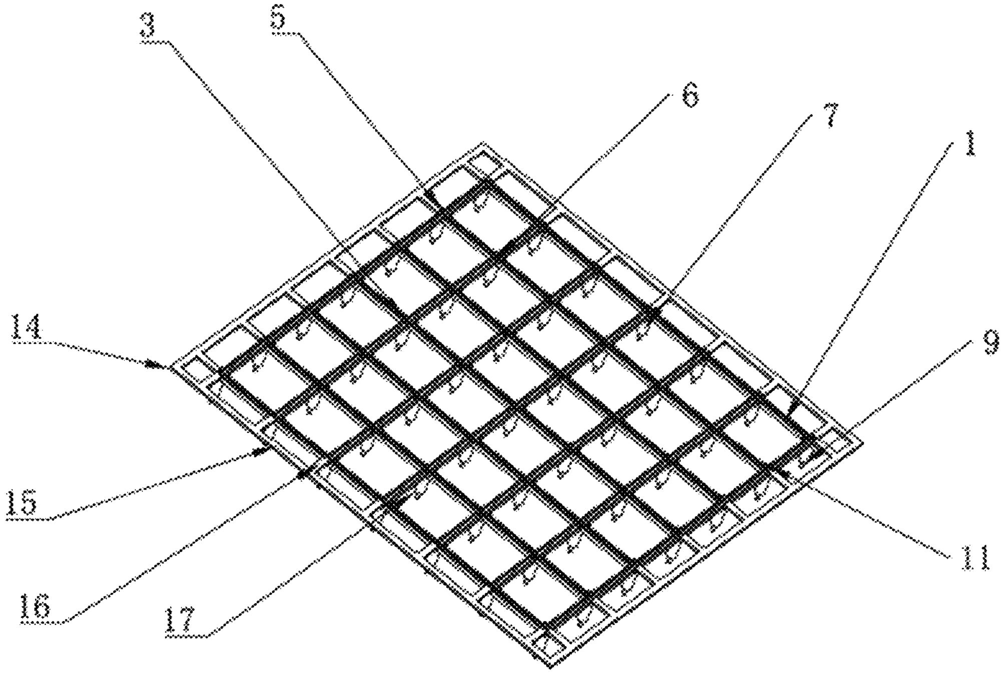
FIG. 3 is a schematic structural diagram of an upper cover and a light string of a lawn lamp embodiment according to the present disclosure.
Figure 4:
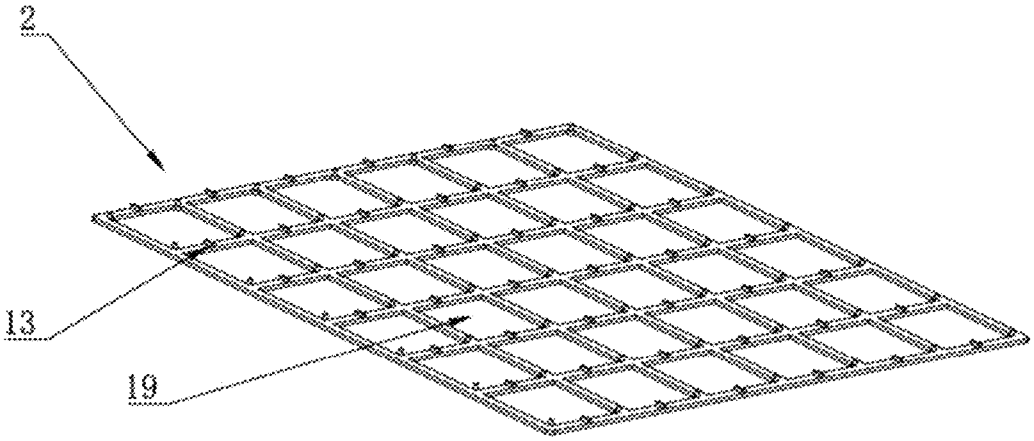
FIG. 4 is a specific schematic structural diagram of a lower cover body of a lawn lamp embodiment according to the present disclosure.
Figure 5:
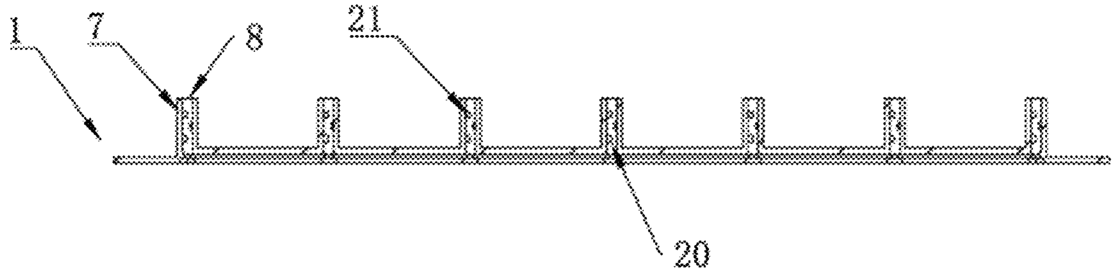
FIG. 5 is a sectional view of an upper cover body of a lawn lamp embodiment according to the present disclosure.

Referring to FIG. 1 to FIG. 4, a further explanation is made to the embodiments of a lawn lamp according to the present disclosure.

For ease of explanation, spatial relative terms such as “up”, “down”, “left”, and “right” are used in the embodiments to illustrate a relationship between one element or feature shown in the figures and another element or feature. It should be understood that in addition to the orientations shown in the figures, the spatial terms are intended to include different orientations of a device during use or operation. For example, if the device in the figures is placed upside down, an element described as being located “below” another element or feature will be positioned as being “above” the another element or feature. Therefore, the exemplary term “down” can include both up and down orientations. The device can be positioned in other ways (rotated 90 degrees or in other orientations), and the spatial relative explanations used here can be explained correspondingly.

Moreover, relational terms such as “first” and “second” are only used to distinguish one component from another with the same name, without necessarily requiring or implying any actual relationship or order between these components.

A lawn lamp includes an upper cover body 1, a lower cover body 2 detachably connected to the upper cover body 1, and a light string 3, wherein the upper cover body 1 is assembled with the lower cover body 2 to form a main frame body 4; the upper cover body 1 is provided with a wiring slot 5; the upper cover body and the lower cover body 2 are connected to form a mounting chamber 6; the mounting chamber 6 is used for mounting and arranging the light string 3; the upper cover body 1 is uniformly distributed with several fixed columns 7; each of the fixed columns 7 is provided with a lamp outlet 8 communicated to the mounting chamber 6; LED parts 9 of the light string 3 are threaded out of the mounting chamber 6; and luminous parts are exposed out of the lamp outlets 8.

The light string 3 is arranged in the main frame body 4; the light string 3 is distributed along the wiring slot 5 formed by connecting the upper cover body with the lower cover body 2, so that mounting and wire arrangement are convenient, and entanglement of a wiring harness can be effectively prevented during use; and after the mounting of the light string 3 is completed, the LED parts 9 of the light string 3 are exposed out of a lamp outlets 8, which enhances the lighting effect of the lawn lamp. Furthermore, ornamental flowers and plants are arranged above the main frame body 4 to prevent the main frame body 4 from being exposed out of the lawn, which improves the overall aesthetics of the lawn lamp.

In order to improve the accuracy of connection between the upper cover body and the lower cover body 2 and improve the stability of the light string 3 inside the main frame body 4, a connecting structure 10 is arranged between the upper cover body 1 and the lower cover body 2. The connecting structure 10 includes mounting holes 11 arranged at a bottom of the upper cover body 1 and mounting columns 12 arranged on the lower cover body 2 and matched with the mounting holes 11; and the connecting structure 10 further includes convex blocks structure 13 arranged on a lower cover plate and matched with a slot width of the wiring slot 5. The connection and matching between the upper cover body and the lower cover body 2 are facilitated during the mounting. After the mounting of the upper cover body 1 and the lower cover body 2 is completed, the wiring harness in the wiring slot 5 is fixed by the convex block structures 13 on the lower cover plate, which prevents the movement of the wiring harness and improve the stability of the wiring harness in the wiring slot 5.

Further, in order to prevent the lower cover body 2 from being separated after the lower cover body is connected with the upper cover body 1 and improve the stability of the lawn lamp after mounting, an extension frame body 14 is arranged at the periphery of the upper cover body 1, and the extension frame body 14 and the upper cover body 1 forms a step structure. The extension frame body 14 includes two first edges 15 and two second side edges 16; the two first side edges 15 are uniformly distributed with several mounting through holes; the two second side edges 16 are also uniformly distributed with mounting columns 12 matched with the mounting through holes; and the mounting through holes and the mounting columns 12 are used for extending and assembling a plurality of main frame bodies 4. Meanwhile, after the mounting and matching between the lower cover body 2 and the upper cover body 1 are completed, the lower cover body 2 is flush with a lower surface of the extension frame body 14. After the mounting is completed, the lower cover body 2 and a bottom surface of the extension frame body 14 are located on the same plane. This prevents separation of the lower cover body 2 from the upper cover body 1 due to the action of an external force. Furthermore, the main frame body 4 has a compact structure after assembling is completed, and the lawn lamp has good stability when mounted on a green belt.

Meanwhile, in order to facilitate decorating the mounted main frame body 4, an end surface positioning member 17 is arranged on an end surface of an open end of each fixed column 7. The end surface positioning members 17 are connected to the fixed columns 7 to form connecting plugs 18; and the connecting plugs 18 are used for plugging various types of plastic flowers and plants. A maximum outer diameter of each end surface positioning member 17 is between 1.1 times and 1.2 times an outer diameter of each fixed column 7. A side wall of the end surface positioning member 17 is in a circular arc shape. After the end surface positioning members 17 and the fixed columns 7 have been mounted, and the LED parts 9 are exposed out of the fixed columns 7, gaps for plugging the plastic flowers and plants are formed between the LEDs and the end surface positioning members 17, so that it is convenient to mount the plastic flowers and plants; and the connection strength is high, so that it is hard for the plastic flowers and plants to fall off.

In addition, in order to enhance the lighting effect of the lawn lamp at night, the upper cover body and the lower cover body 2 are arranged into grid structures 19, and a cell of each grid structure 19 is of a polygonal structure. Furthermore, the fixed columns 7 are arranged at vertex angles of the various cells. The LED parts 9 of the light string 3 are uniformly distributed on the main frame body 4 to prevent the problem of concentrated or scattered lighting, which enhances the lighting effect of the lawn lamp. Meanwhile, a wire clamping structure 20 is arranged between the wiring slot 5 and each light outlet 8. The wire clamping structure 20 includes an arc-shaped wall arranged at a connection between the lamp outlet 8 and the wiring slot 5; an opening direction of the arc-shaped wall faces an outer side of the wiring slot 5; three wire clamping blocks 21 are arranged on an inner wall of the lamp outlet 8; two wire clamping blocks 21 are located on the same side, and the other wire clamping block 21 is located on the opposite side; thicknesses of the two wire clamping blocks 21 on the same side are greater than a thickness of the other wire clamping block 21; a distance between the two wire clamping blocks 21 on the two sides is matched with an outer diameter of each LED; and distances between a guide part of the light string 3 and the two wire clamping blocks 21 on the two sides are in an interference fit.

The wiring harness inside the main frame body 4 is further fixed through the wire clamping structure 20, which improves the stability inside the lawn lamp and can prevent the LED parts 9 of the light string 3 from moving at the lamp outlets 8.

The above-mentioned embodiments are only preferred embodiments of the present disclosure and are not intended to limit the present disclosure, and the usual changes and substitutions made by those skilled in the art within the scopes of the technical solutions of the present disclosure shall fall within the protection scope of the present disclosure.

What is claimed is:

1. A lawn lamp, comprising an upper cover body (1), a lower cover body (2) detachably connected to the upper cover body (1), and a light string (3), wherein the upper cover body (1) is assembled with the lower cover body (2) to form a main frame body (4): the upper cover body (1) is provided with a wiring slot (5): the upper cover body and the lower cover body (2) are connected to form a mounting chamber (6): the mounting chamber (6) is used for mounting and arranging the light string (3): the upper cover body (1) is uniformly distributed with several fixed columns (7): each of the fixed columns (7) is provided with a lamp outlet (8) communicated to the mounting chamber (6): light-emitting diode (LED) parts (9) of the light string (3) are threaded out of the mounting chamber (6); and luminous parts are exposed out of the lamp outlets (8);

a connecting structure (10) is arranged between the upper cover body (1) and the lower cover body (2); the connecting structure (10) comprises a mounting hole (11) arranged at a bottom of the upper cover body (1) and a mounting column (12) arranged on the lower cover body (2) and matched with the mounting hole (11); the connecting structure (10) further comprises a convex block structure (13) arranged on a lower cover plate and matched with a slot width of the wiring slot (5); and when the upper cover body and the lower cover body (2) are connected and matched, the convex block structure (13) on the lower cover plate is placed in the wiring slot (5).

2. The lawn lamp according to claim 1, wherein an extension frame body (14) is arranged at a periphery of the upper cover body (1): a step structure is formed between the extension frame body (14) and the bottom of the upper cover body (1); and when the mounting column (12) of the lower cover body (2) and the mounting hole (11) of the upper cover body (1) are mounted and matched, the lower cover body (2) is flush with a lower surface of the extension frame body (14).

3. The lawn lamp according to claim 2, wherein the extension frame body (14) comprises two first edges (15) and two second side edges (16): the two first side edges (15) are uniformly distributed with several mounting through holes: the two second side edges (16) are also uniformly distributed with mounting columns (12) matched with the mounting through holes; and the mounting through holes and the mounting columns (12) are used for extending and assembling a plurality of main frame bodies (4).

4. The lawn lamp according to claim 1, wherein an end surface positioning member (17) is arranged on an end surface of an open end of each of the fixed columns (7): the end surface positioning member (17) and the fixed column (7) are connected to form a connecting plug (18) for plugging various types of plastic flowers and plants; and a side wall of the end surface positioning member (17) is in a circular arc shape.

5. The lawn lamp according to claim 4, wherein a maximum outer diameter of the end surface positioning member (17) is between 1.1 times and 1.2 times an outer diameter of the fixed column (7).

6. The lawn lamp according to claim 1, wherein both the upper cover body (1) and the lower cover body (2) are of grid structures (19): a cell of each grid structure (19) is of a polygonal structure; and the fixed columns (7) are arranged at vertex angles of the various cells.

7. The lawn lamp according to claim 1, wherein a wire clamping structure (20) is arranged between the wiring slot (5) and each lamp outlet (8); the wire clamping structure (20) comprises an arc-shaped wall arranged at a connection between the lamp outlet (8) and the wiring slot (5); an opening direction of the arc-shaped wall faces an outer side of the wiring slot (5); three wire clamping blocks (21) are arranged on an inner wall of the lamp outlet (8); two wire clamping blocks (21) are located on the same side, and the other wire clamping block (21) is located on the opposite side; thicknesses of the two wire clamping blocks (21) on the same side are greater than a thickness of the other wire clamping block (21); a distance between the two wire clamping blocks (21) on the two sides is matched with an outer diameter of each LED; and distances between a guide part of the light string (3) and the two wire clamping blocks (21) on the two sides are in an interference fit.

* * * * *